United States Patent
Feng et al.

(10) Patent No.: US 10,365,182 B2
(45) Date of Patent: Jul. 30, 2019

(54) METHOD FOR PERFORMING VIBRATION DETECTION ON A MACHINE TOOL

(71) Applicant: HIWIN TECHNOLOGIES CORP., Taichung (TW)

(72) Inventors: Yi-Jun Feng, Taichung (TW); Min-Hsiu Wu, Taichung (TW)

(73) Assignee: Hiwin Technologies Corp., Taichung (TW)

(*) Notice: Subject to any disclaimer, the term of this patent is extended or adjusted under 35 U.S.C. 154(b) by 223 days.

(21) Appl. No.: 15/641,582

(22) Filed: Jul. 5, 2017

(65) Prior Publication Data
US 2019/0011328 A1 Jan. 10, 2019

(51) Int. Cl.
*G06F 11/30* (2006.01)
*G01M 13/045* (2019.01)
*G01P 3/00* (2006.01)
*G01H 13/00* (2006.01)
*G01M 99/00* (2011.01)
*G01H 1/06* (2006.01)

(52) U.S. Cl.
CPC ............ *G01M 13/045* (2013.01); *G01H 1/06* (2013.01); *G01H 13/00* (2013.01); *G01M 99/008* (2013.01); *G01P 3/00* (2013.01)

(58) Field of Classification Search
None
See application file for complete search history.

(56) References Cited

U.S. PATENT DOCUMENTS

| | | | | |
|---|---|---|---|---|
| 6,054,795 A | * | 4/2000 | Yamamoto | H02N 2/14 310/316.01 |
| 2018/0284757 A1 | * | 10/2018 | Cella | G05B 23/024 |

* cited by examiner

*Primary Examiner* — Aditya S Bhat
(74) *Attorney, Agent, or Firm* — Rosenberg, Klein & Lee

(57) ABSTRACT

A method for performing vibration detection on a feed system of a machine tool is implemented by a detecting device, and includes: calculating a target frequency range associated with a rotation speed of the machine tool; detecting vibration of the feed system in a static state; calculating a smoothed signal according to detected result, the smoothed signal including a plurality of noise amplitude values distributed across the target frequency range; identifying a measurement frequency that corresponds with a smallest one of the noise amplitude values; calculating a suggested rotation speed based on the measurement frequency; and detecting vibration of the feed system rotating at the suggested rotation speed.

13 Claims, 10 Drawing Sheets

METHOD FOR PERFORMING VIBRATION DETECTION ON A MACHINE TOOL

FIELD

The disclosure relates to a method for performing vibration detection, more particularly to a method for performing vibration detection on a machine tool.

BACKGROUND

A feed system in a machine tool is typically implemented using a linear motion system and includes components such as a ball screw, a guideway, a bearing, a coupling, a motor, etc. It may be beneficial to perform a check for one or more of the components in the feed system, in order to detect any irregularity within the feed system (e.g., failure and/or abrasions on internal components).

Conventionally, one way to perform such check involves placing a vibration detector externally of the feed system. The vibration detector is capable of detecting vibration of the feed system and generating a signal based on the result of the detection. The signal may then be processed by a microprocessor in order to determine whether any irregularity exists.

In processing the signal, it may be desired to reduce the effect of ambient noise (e.g., self-vibration of the machine tool, outside environment, noises from a power source to the feed system or the vibration detector, etc.) on the signal.

A number of ways have been proposed to address this issue. For example, a specific industrial vibration sensor, which is resistant to noise, may be employed for detecting the vibration of the feed system. Alternatively, a plurality of conventional vibration detectors may be placed at different locations with respect to the feed system, and multiple signals may be obtained and processed by the microprocessor, in order to obtain an adjusted signal that has the effect brought about by the ambient noise reduced.

SUMMARY

One object of the disclosure is to provide a method that is capable of performing vibration detection on a machine tool, without use of a specifically designed sensor or multiple sensors.

According to one embodiment of the disclosure, the method is implemented by a detecting device that includes a microprocessor and a vibration detector. The machine tool includes a feed system and a motor connected to the feed system. The feed system includes a number of rotational components. The method includes steps of:

a) calculating, by the microprocessor, a target frequency range associated with a rotation speed of the machine tool, the rotation speed of the machine tool having a maximum value specified by an original equipment manufacturer (OEM) of the machine tool;

b) detecting, by the vibration detector, vibration of the feed system attributed to ambient noise when the feed system is in a static state;

c) calculating, by the microprocessor, a smoothed signal according to detected result of the vibration of the feed system detected in step b), the smoothed signal including a plurality of noise amplitude values distributed across the target frequency range;

d) identifying, by the microprocessor, a frequency within the target frequency range that corresponds with a smallest one of the noise amplitude values of the smoothed signal as a measurement frequency;

e) calculating, by the microprocessor, a suggested rotation speed based on the measurement frequency;

f) detecting, by the vibration detector, vibration of a to-be-detected component selected from the number of rotational components of the feed system, when the motor is driving the number of rotational components of the feed system to rotate at the suggested rotation speed; and g) obtaining, by the microprocessor, a dynamic vibration signal according to detected result of the vibration of the feed system detected in step f).

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
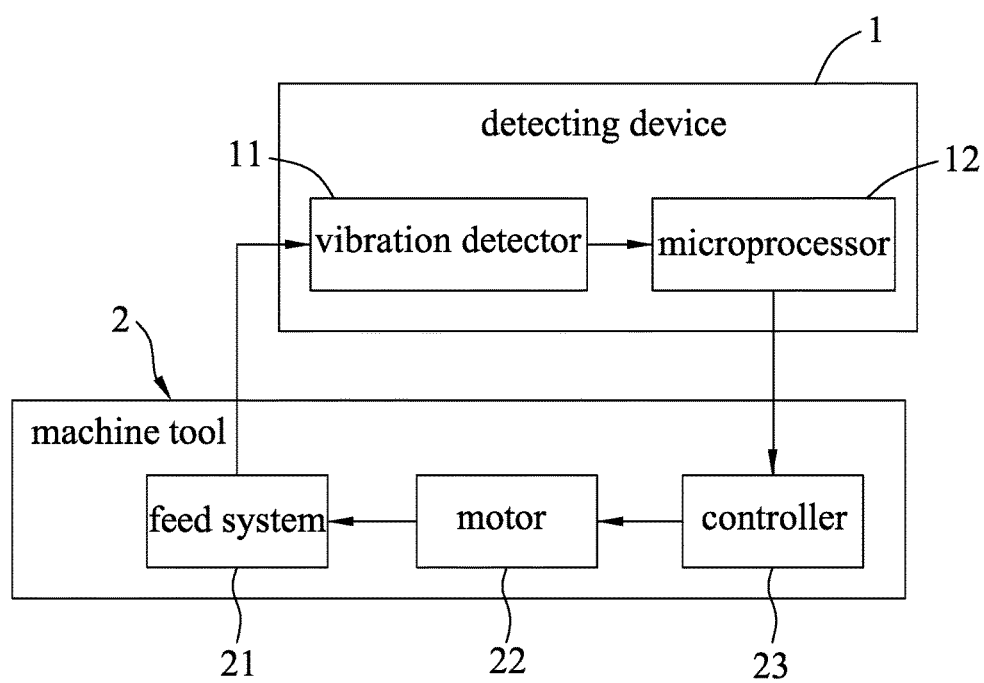
FIG. 1 is a block diagram illustrating a detecting device and a machine tool according to one embodiment of the disclosure.

FIG. 1 is a block diagram illustrating a detecting device 1 and a machine tool 2 according to one embodiment of the disclosure. The detecting device 1 is configured to be installed in the machine tool 2 in order to perform vibration detection on the machine tool 2.

The machine tool 2 includes a feed system 21, a motor 22 electrically connected to the feed system 21, and a controller 23. It should be noted that some components of the machine tool 2 that are not relevant to the vibration detection are not shown in FIG. 1.

Figure 2:
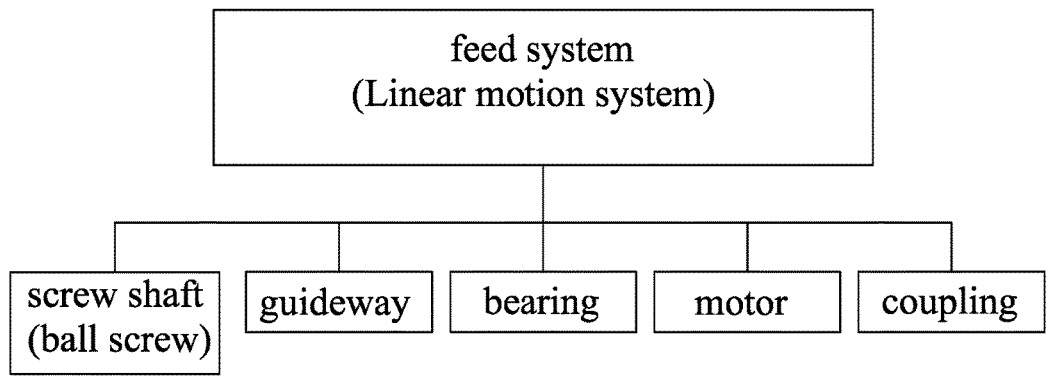
FIG. 2 is a block diagram illustrating a number of components included in a feed system of the machine tool.

FIG. 2 is a block diagram illustrating a number of components included in the feed system 21 of the machine tool 2.

Figure 3:
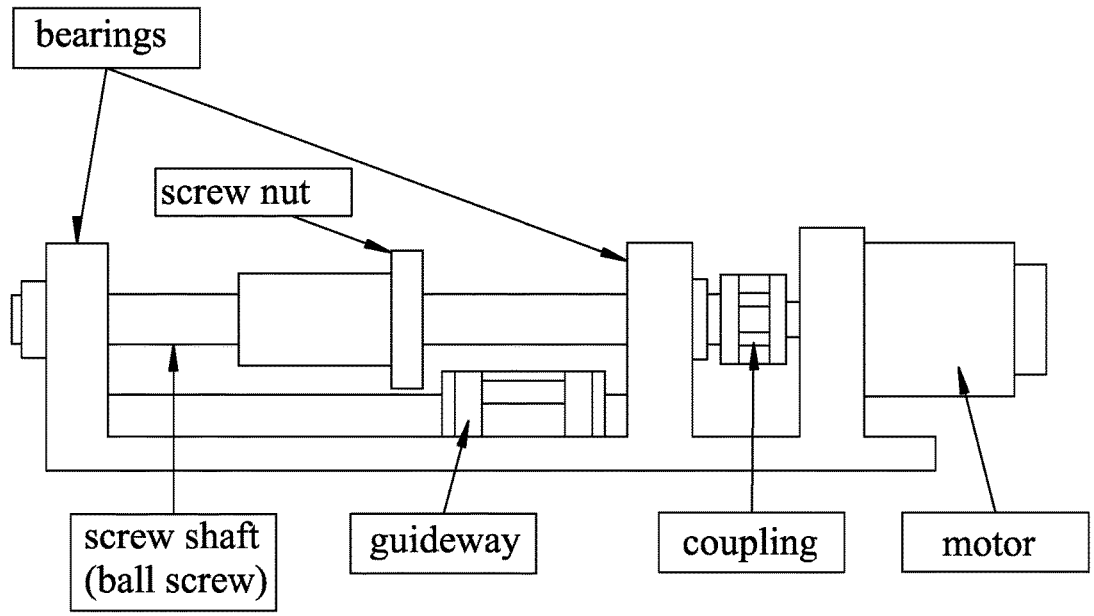
FIG. 3 illustrates connections among the number of rotational components of the feed system.

Specifically, the feed system 21 is in the form of a feed shaft, and includes a number of rotational and non-rotational components. In one example as shown in FIG. 3, the feed system 21 includes a screw shaft (e.g., a ball screw in this embodiment), a screw nut (e.g., a ball bearing in this embodiment) that is sleeved on the screw shaft and that contains a number of balls therein, a guideway, a coupling, and at least one bearing, respectively. Specifically, the rotational components include the screw shaft, the screw nut, the coupling, and the bearing. On the other hand, the guideway is a non-rotational component.

The motor 22 is electrically connected to the screw shaft of the feed system 21 via the coupling, and is electrically connected to the controller 23. The controller 23 is configured to generate a control signal so as to control the motor 22 to drive the screw shaft to rotate at a designated speed.

The detecting device 1 is capable of performing the vibration detection on a to-be-detected component of the feed system 21 while the feed system 21 is rotating. As such, the detecting device 1 may be able to detect abnormality of the to-be-detected component (e.g., the to-be-detected component being damaged due to friction).

In this embodiment, the detecting device 1 includes a microprocessor 12 and a vibration detector 11 coupled to the microprocessor 12. The vibration detector 11 may be employed using one used in general experiments.

In use, the vibration detector 11 is attached (e.g., by installation, adsorption, securing, pasting, etc.) to the to-be-detected component of the feed system 21, in order to detect vibration of the to-be-detected component. Based on the vibration thus detected, the vibration detector 11 is programmed to generate a vibration signal, and to transmit the vibration signal to the microprocessor 12. The microprocessor 12 is then able to determine whether the to-be-detected component is normal.

It is noted that an effect on the vibration detector 11 caused by the ambient noise (e.g., self-vibration of the machine tool 2, outside environment, noises from a power source powering the detecting device 1 and/or the machine tool 2) may adversely affect the detection of the vibration detector 11 and subsequently to the vibration signal generated thereby. As such, a method for performing vibration detection on the machine tool 2 may be implemented by the detecting device 1.

Figure 4:
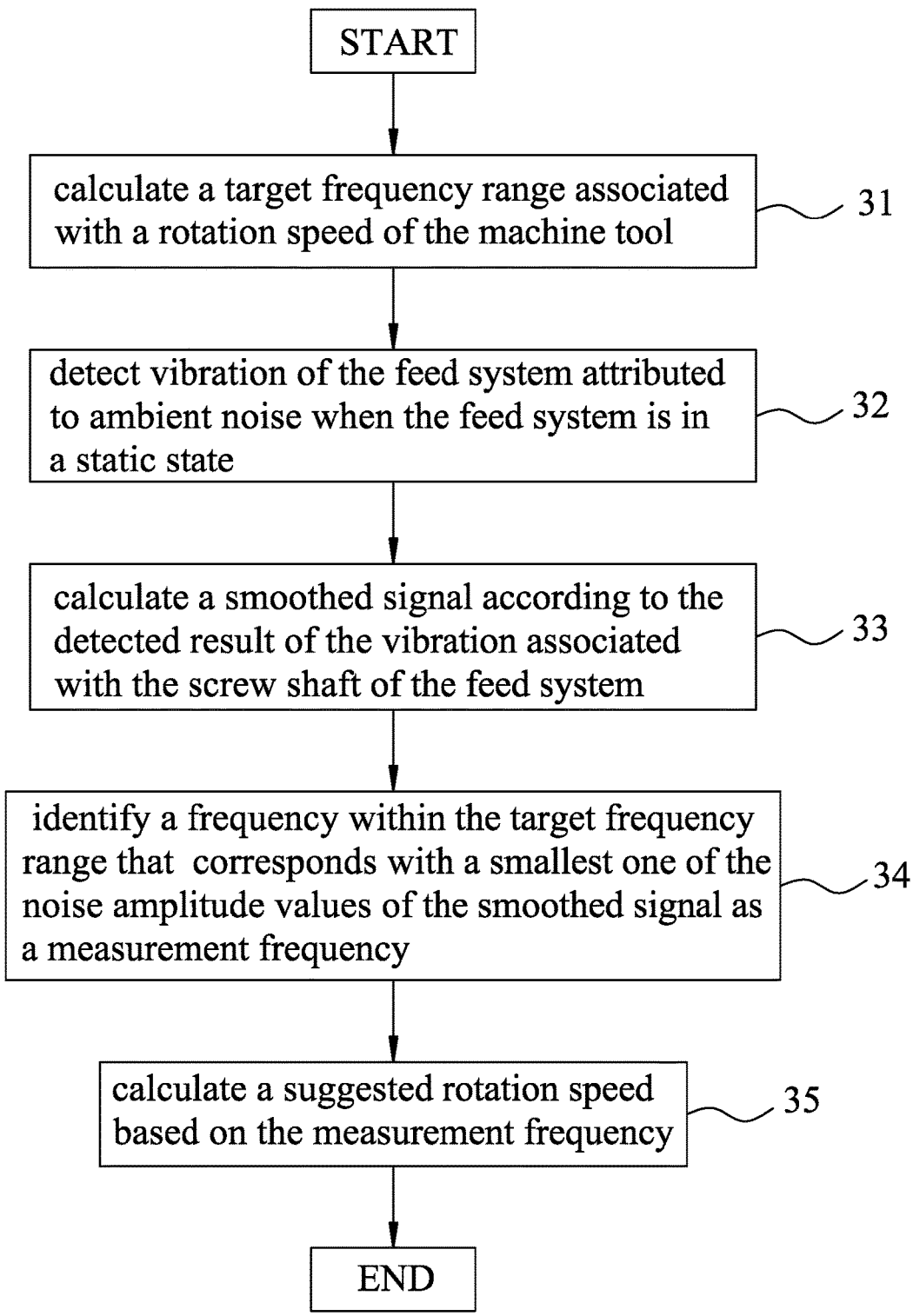
FIG. 4 is a flow chart illustrating steps of a method for performing vibration detection on the machine tool, according to one embodiment of the disclosure.

FIG. 4 is a flow chart illustrating steps of the method according to one embodiment of the disclosure. In this embodiment, the vibration detector 11 is connected to the screw shaft, which serves as the to-be-detected component.

In step 31, the microprocessor 12 calculates a target frequency range associated with a rotation speed of the machine tool 2. Specifically, the rotation speed of the machine tool 2 has a maximum value specified by an original equipment manufacturer (OEM) of the machine tool 2. That is to say, the rotation speed of the machine tool 2 is limited by a specification provided by the OEM.

Specifically, in step 31, the calculation of the target frequency range may be implemented by the following sub-steps 311 to 314.

Figure 5:
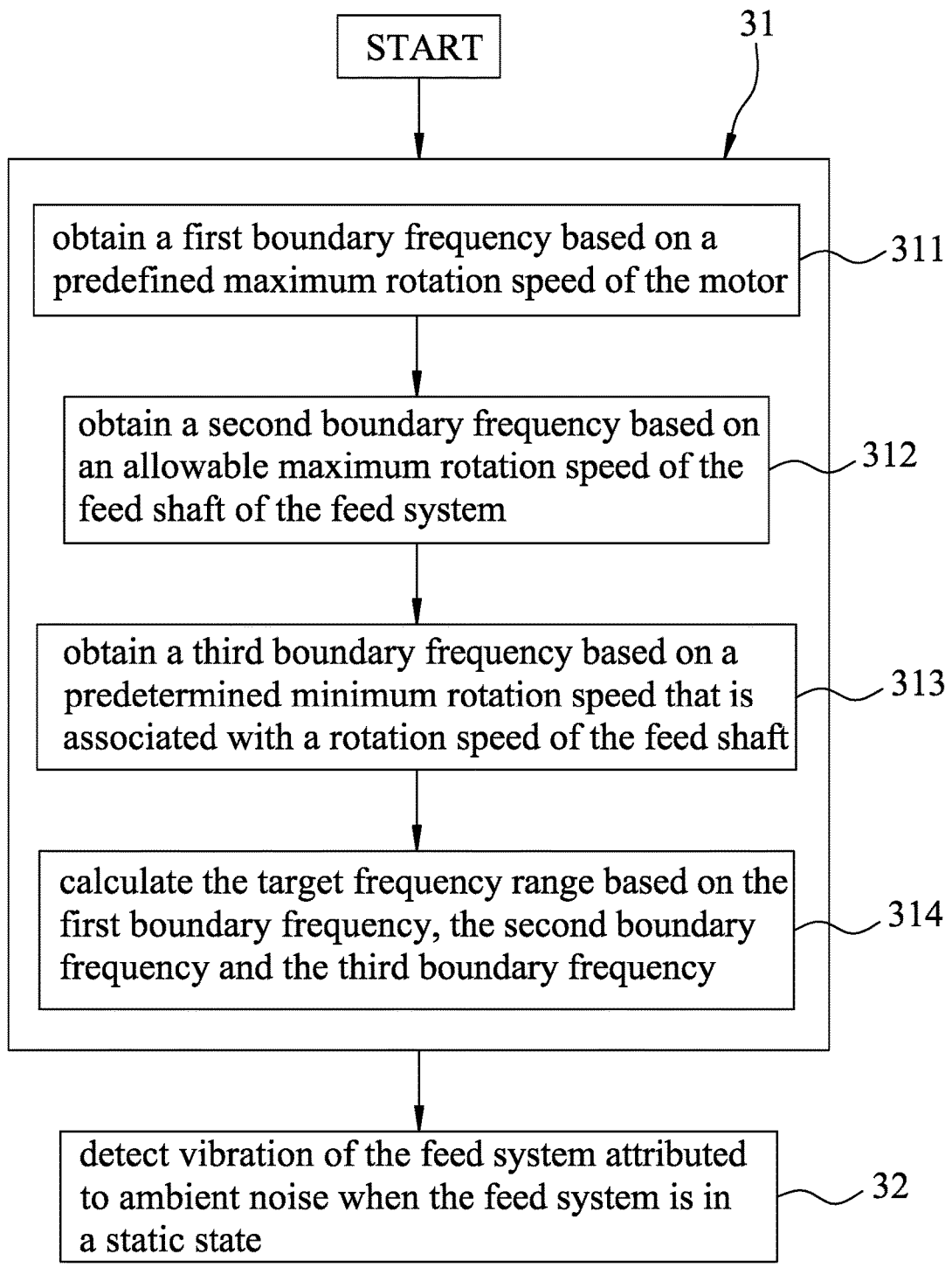
FIG. 5 is a flow chart illustrating sub-steps for calculating a target frequency range in the method of FIG. 4.
Figure 6:
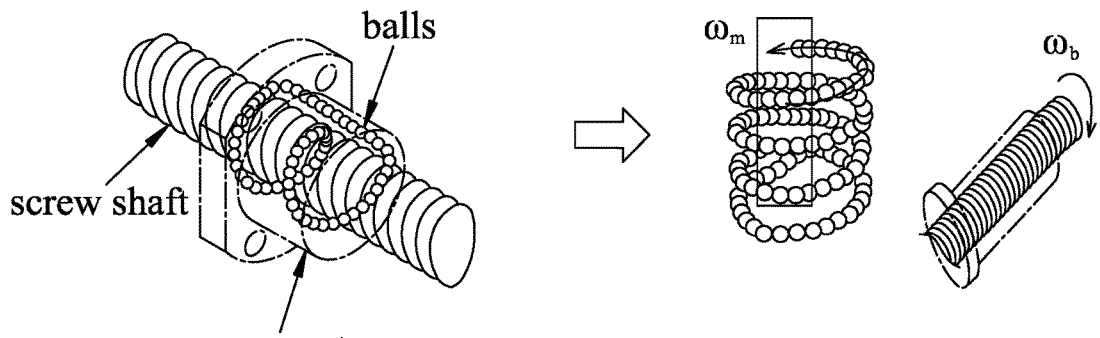
FIG. 6 illustrates a number of balls in a screw shaft of the feed system.
Figure 7:
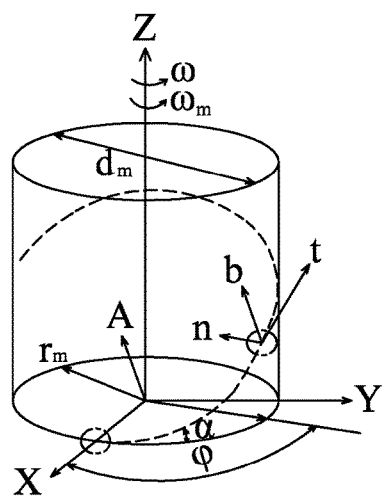
FIG. 7 illustrates adjacent balls in the screw shaft.
Figure 7:
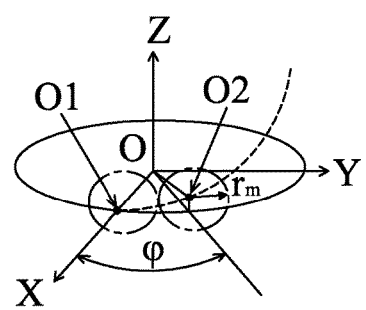
Figure 8:
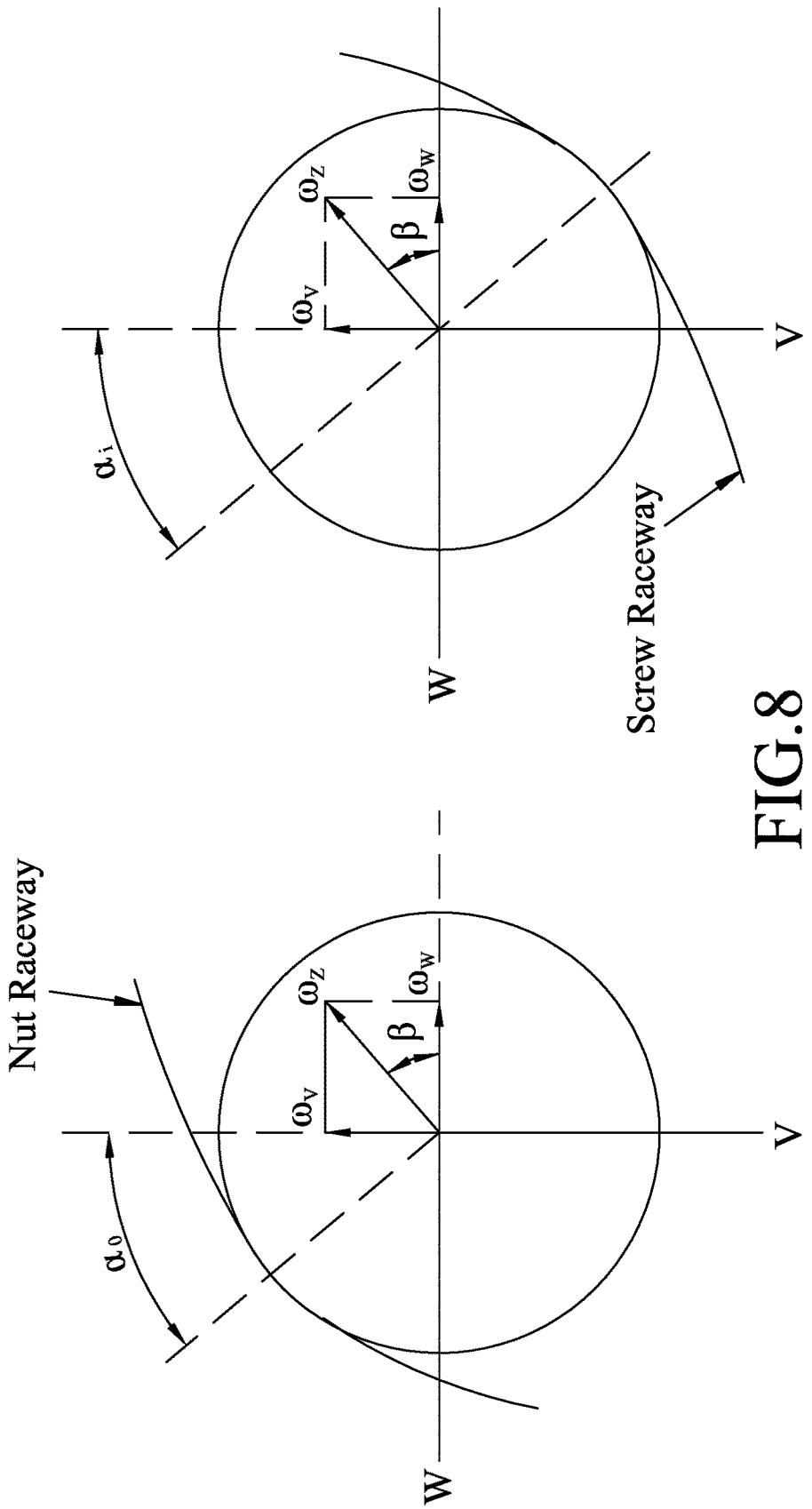
FIG. 8 illustrates contacts between the balls and grooves of the feed system.

Referring to FIG. 5, in sub-step 311, the microprocessor 12 obtains a first boundary frequency based on a predefined maximum rotation speed of the motor. In particular, the first boundary frequency is obtained by:

$$f1 = \frac{\omega_{m1}}{\psi} \quad (1)$$

$$\omega_{m1} = \frac{\omega_{b1}}{1 + \frac{\left(1 + \frac{r_b \cdot \cos\alpha_0}{r_m}\right) \cdot (\tan\beta \cdot \sin\alpha_i + \cos\alpha_i)}{\left(1 + \frac{r_b \cdot \cos\alpha_i}{r_m}\right) \cdot (\tan\beta \cdot \sin\alpha_0 + \cos\alpha_0)}}, \quad (2)$$

$$\frac{r_b}{r_m} = \frac{\sqrt{2 \cdot (1 - \cos\Psi) + (\Psi + \tan\alpha)^2}}{2}, \quad (3)$$

where f1 represents the first boundary frequency, $\omega_{m1}$ represents a first revolution speed of the balls in the screw nut rotating around the screw shaft (see FIG. 6), $\psi$ represents a phase angle formed between adjacent balls in the screw nut (see FIG. 7) of the feed system 21, $\omega_{b1}$ represents the predefined maximum rotation speed of the motor 22 (e.g., 3000 revolutions per minute (rpm)), $r_b$ represents a radius of the balls in the screw nut, $\alpha$ represents a lead angle of the screw shaft, $\alpha_0$ represents an angle of contact between the balls in the screw nut and a groove (see FIG. 8) in the screw nut, $\alpha_1$ represents an angle of contact between the balls in the screw nut and a groove (see FIG. 8) in the screw shaft, $r_m$ represents a pitch circle radius of the screw shaft, and $\beta$ represents a spin angle of the balls in the screw nut. In this embodiment, the above parameters may be known from a specification of the feed shaft. In calculation, the microprocessor 12 may first calculate the ratio of $r_b/r_m$ using equation (3). Afterward, the microprocessor 12 may calculate the first revolution speed using equation (2) with the ratio of $r_b/r_m$ obtained from equation (3), and then calculate the first boundary frequency using equation (1).

In sub-step 312, the microprocessor 12 obtains a second boundary frequency based on an allowable maximum rotation speed of the feed shaft of the feed system 22. In particular, the second boundary frequency is obtained by:

$$f2 = \frac{\omega_{m2}}{\Psi} \quad (4)$$

$$\omega_{m2} = \frac{\omega_{b2}}{1 + \frac{\left(1 + \frac{r_b \cdot \cos\alpha_0}{r_m}\right) \cdot (\tan\beta \cdot \sin\alpha_i + \cos\alpha_i)}{\left(1 - \frac{r_b \cdot \cos\alpha_i}{r_m}\right) \cdot (\tan\beta \cdot \sin\alpha_0 + \cos\alpha_0)}}, \quad (5)$$

where f2 represents the second boundary frequency, $\omega_{m2}$ represents a second revolution speed of the ball in the screw shaft of the motor 22, and $\omega_{b2}$ represents the allowable maximum rotation speed of the feed shaft of the motor 22 (e.g., 4276 rpm). In calculation, the microprocessor 12 may first calculate the second revolution speed using equation (5) with the ratio of $r_b/r_m$ obtained from equation (3). Afterward, the microprocessor 12 calculates the second boundary frequency using equation (4).

In sub-step 313, the microprocessor 12 obtains a third boundary frequency based on a predetermined minimum rotation speed that is associated with a rotation speed of the feed shaft. It is noted that the predetermined minimum rotation speed may for example be set by a user according to specification of the to-be-detected component.

In particular, the third boundary frequency is obtained by:

$$f3 = \frac{\omega_{m3}}{\Psi} \quad (6)$$

$$\omega_{m3} = \frac{\omega_{b3}}{1 + \frac{\left(1 + \frac{r_b \cdot \cos\alpha_0}{r_m}\right) \cdot (\tan\beta \cdot \sin\alpha_i + \cos\alpha_i)}{\left(1 - \frac{r_b \cdot \cos\alpha_i}{r_m}\right) \cdot (\tan\beta \cdot \sin\alpha_0 + \cos\alpha_0)}}, \quad (7)$$

where f3 represents the third boundary frequency, $\omega_{m3}$ represents a third revolution speed of the ball in the screw shaft of the motor (22), and $\omega_{b3}$ represents the predetermined lowest rotation speed (e.g., 1000 rpm).

In calculation, the microprocessor 12 may first calculate the third revolution speed using equation (7) with the ratio of $r_b/r_m$ obtained from equation (3). Afterward, the microprocessor 12 calculates the third boundary frequency using equation (6).

In sub-step 314, the microprocessor 12 calculates the target frequency range based on the first boundary frequency, the second boundary frequency and the third boundary frequency.

Specifically, a maximum value of the target frequency range is set to be no greater than any one of the first boundary frequency and the second boundary frequency, and a minimum value of the target frequency range is set to be no smaller than the third boundary frequency. For example, calculations made for a particular feed system 21 yielded a first boundary frequency of 580 Hz, a second boundary frequency of 827 Hz and a third boundary frequency of 193 Hz. Using the above rules, the maximum value of the target frequency range may be set as 580 Hz, and the minimum value of the target frequency range may be set as 193 Hz.

Figure 10:
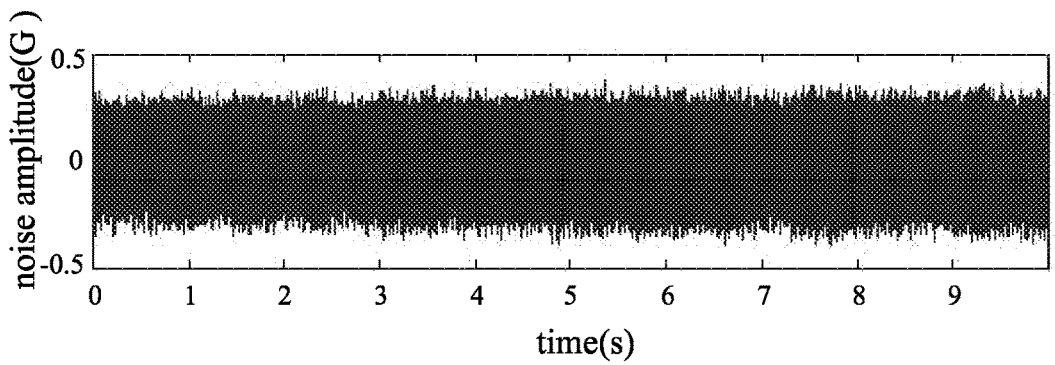
FIG. 10 illustrates an exemplary time-domain vibration signal.

Referring to FIGS. 1 and 4 again, in step 32, the vibration detector 11 detects vibration of the feed system 21 attributed to ambient noise when the feed system 21 is in a static state (i.e., the screw shaft is not rotating). Afterward, the vibration detector 11 outputs, to the microprocessor 12, a time-domain vibration signal as detected result of the vibration of the screw shaft of the feed system 21. FIG. 10 illustrates an exemplary time-domain vibration signal thus generated.

Then, in step 33, the microprocessor 12 calculates a smoothed signal according to the detected result of the vibration associated with the screw shaft of the feed system 21 detected in step 32. The smoothed signal includes a plurality of noise amplitude values distributed across the target frequency range.

Figure 9:
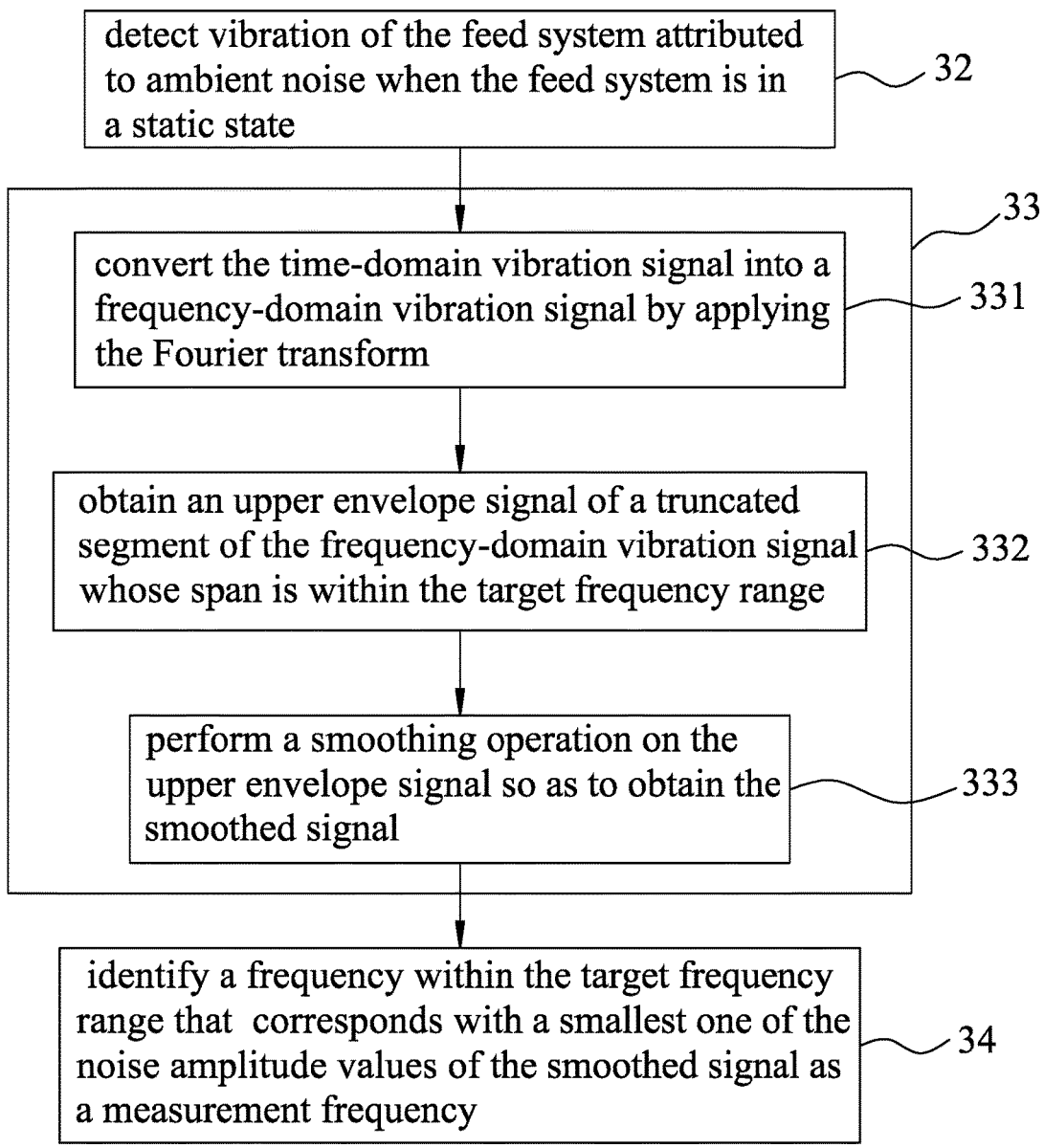
FIG. 9 is a flow chart illustrating sub-steps for calculating a smoothed signal in the method of FIG. 4.

Referring to FIG. 9, step 33 may include the following sub-steps 331 to 334.

Figure 11:
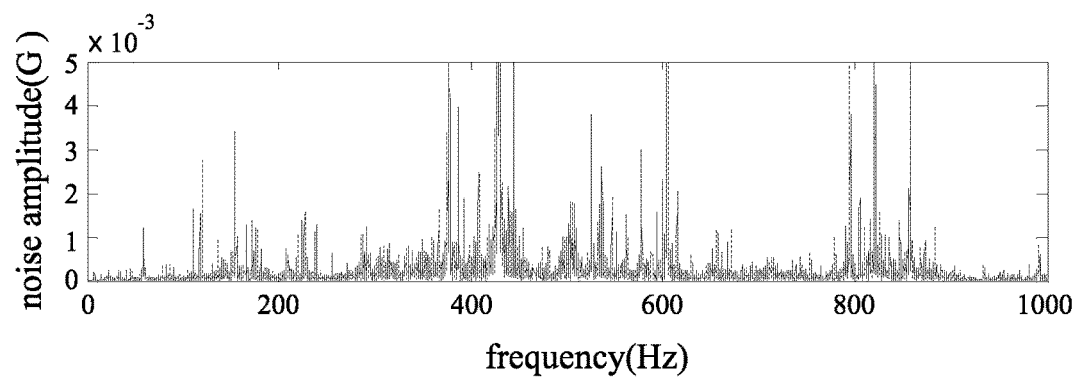
FIG. 11 illustrates a frequency-domain vibration signal obtained from the time-domain vibration signal in FIG. 10.

In sub-step 331, the microprocessor 12 converts the time-domain vibration signal into a frequency-domain vibration signal by applying the Fourier transform. The frequency-domain vibration signal spans a static frequency range that reaches beyond the target frequency range. FIG. 11 illustrates a frequency-domain vibration signal obtained from the time-domain vibration signal in FIG. 10, with the static frequency range spreading between 0 Hz and 1000 Hz.

Figure 12:
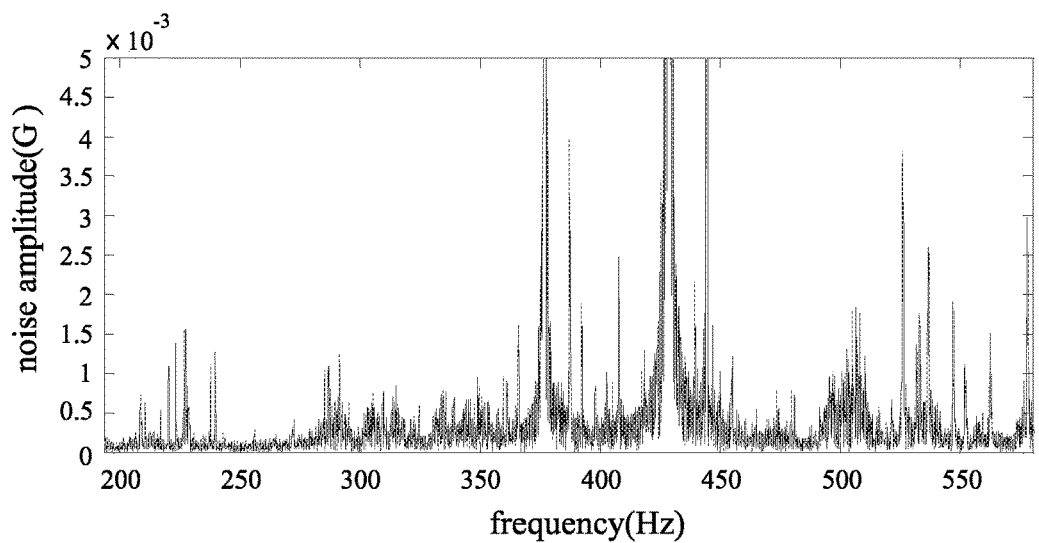
FIG. 12 illustrates an exemplary truncated segment of the frequency-domain vibration signal.

In sub-step 332, the microprocessor 12 obtains an upper envelope signal of a truncated segment of the frequency-domain vibration signal whose span is within the target frequency range. In this embodiment, the truncated segment of the frequency-domain vibration signal spans from 193 Hz to 580 Hz. FIG. 12 illustrates an exemplary truncated segment of the frequency-domain vibration signal.

Figure 13:
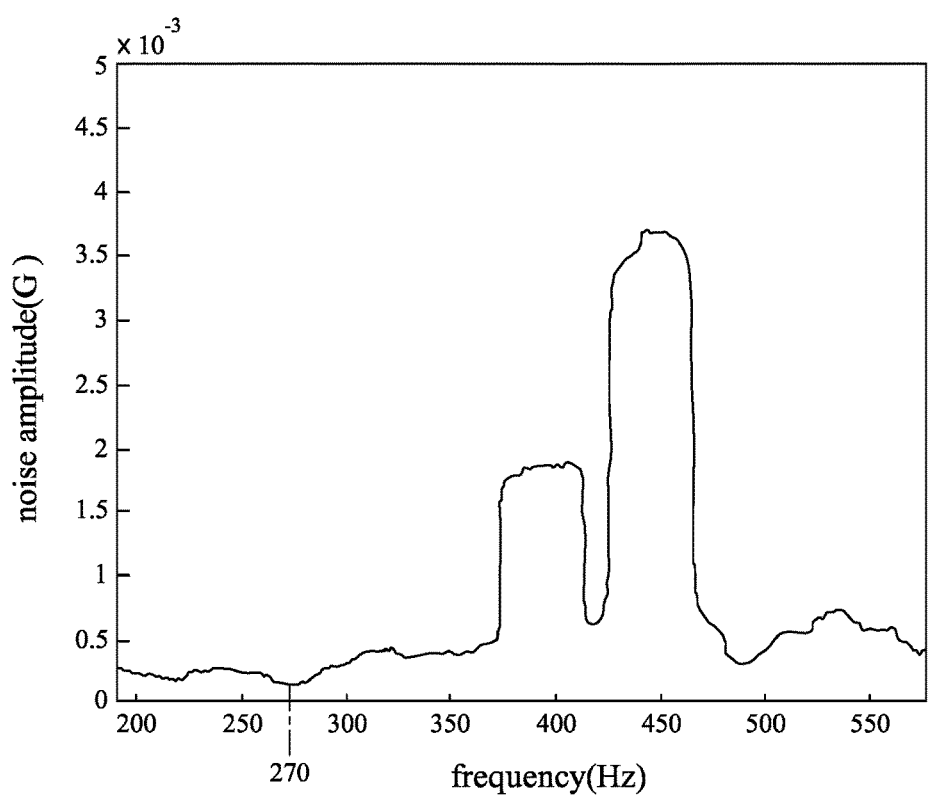
FIG. 13 illustrates an exemplary smoothed signal.

In sub-step 333, the microprocessor 12 performs a smoothing operation on the upper envelope signal so as to obtain the smoothed signal. FIG. 13 illustrates an exemplary smoothed signal obtained from the upper envelope signal of the truncated segment of FIG. 12. The smoothing operation may be performed by calculating a moving average curve of the upper envelope signal, or by applying a low-pass filter to the upper envelope signal. In this embodiment, the smoothing operation may be performed by calculating the moving average curve of values of frequency spectrum energy of the upper envelope signal, according to a sample range (e.g., ±15 Hz) inputted by a user.

Referring to FIGS. 1 and 4 again, in step 34, the microprocessor 12 identifies a frequency within the target frequency range that corresponds with a smallest one of the noise amplitude values of the smoothed signal as a measurement frequency. Referring to FIG. 13, the measurement frequency may be 270 Hz that corresponds with the smallest noise amplitude value of the smoothed signal.

In step 35, the microprocessor 12 calculates a suggested rotation speed based on the measurement frequency.

Specifically, the suggested rotation speed is obtained by:

$$\omega_{b4} = f4 \cdot \Psi \cdot \left[ 1 + \frac{\left(1 + \frac{r_b \cdot \cos\alpha_0}{r_m}\right) \cdot (\tan\beta \cdot \sin\alpha_i + \cos\alpha_i)}{\left(1 - \frac{r_b \cdot \cos\alpha_i}{r_m}\right) \cdot (\tan\beta \cdot \sin\alpha_0 + \cos\alpha_0)} \right], \quad (8)$$

where f4 represents the measurement frequency, and $\omega_{b4}$ represents the suggested rotation speed expressed in revolutions per second (rps).

Then, in step 36, the microprocessor 12 transmits a message including the suggested rotation speed to the controller 23, so as to enable the controller 23 to control the motor 22 to operate in a manner that the screw shaft of the feed system 21 is driven to rotate at the suggested rotation speed. It is noted that in this embodiment, only the rotational components of the feed system 21 rotate at the suggested rotation speed. That is to say, the guideway is not driven by the motor 22 to rotate.

In step 37, the vibration detector 11 detects vibration of the screw shaft of the feed system 21 when the motor 22 is driving the screw shaft of the feed system 21 to rotate at the suggested rotation speed.

In step 38, the microprocessor 12 obtains a dynamic vibration signal according to detected result of the vibration of the screw shaft of the feed system 21 detected in step 37.

Based on the smoothed signal as shown in FIG. 13, it may be seen that in a range with a center at the measurement frequency (e.g., [(270-15) Hz, (270+15) Hz]), the resulting noise values are relatively low. As a result, it may be deduced that when the screw shaft of the feed system 21 rotates at the suggested rotation speed, which is calculated based on the measurement frequency, the noise detected by the vibration detector 11 may be the lowest. In other embodiments, the suggested rotation speed may be calculated based on a frequency within the above range, so as to ensure that the noise detected by the vibration detector 11 is relatively low.

Figure 14:
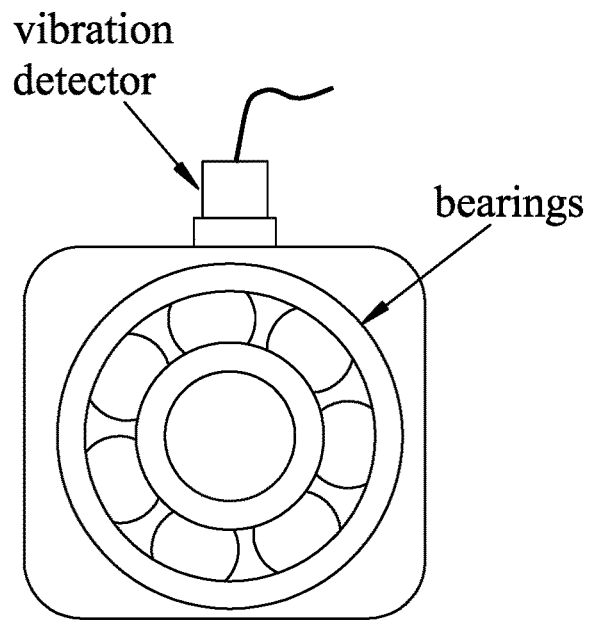
FIG. 14 illustrates a vibration detector attached to a bearing according to one embodiment of the disclosure.

According to one embodiment of the disclosure, the vibration detector 11 is connected to the bearing of the screw shaft which serves as the to-be-detected component (as depicted in FIG. 14).

Figure 15:
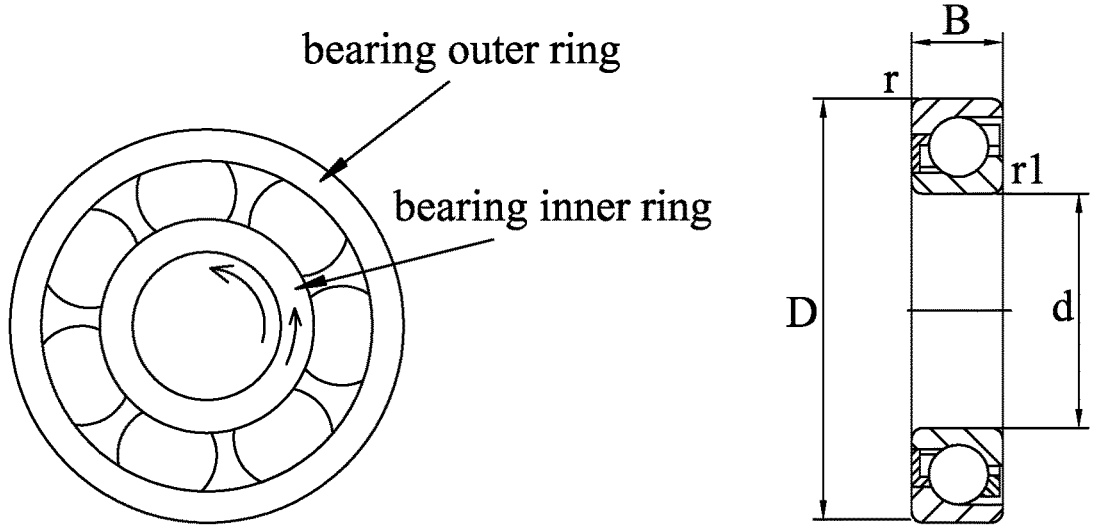
FIG. 15 illustrates a number of balls in contact with an inner ring of the bearing.

In this embodiment, the boundary frequencies are calculated in a different manner. Specifically, in sub-step 311, the microprocessor 12 obtains a first boundary frequency based on the following equation:

$$f1 = \frac{1}{2} \cdot \omega_{b1} \cdot \left(1 + \frac{d}{D} \cdot \cos\alpha'\right) \cdot Z, \quad (9)$$

where f1 represents the first boundary frequency, $\omega_{b1}$ represents the predefined maximum rotation frequency of the motor 22, d represents a diameter of a plurality of balls in the bearing of the feed system 21, D represents a pitch circle diameter of the bearing, α' represents an angle of contact between the balls in the screw nut and an inner ring of the bearing (see FIG. 15, and Z represents the number of the balls in the bearing. The above parameters may be known from the specification of the feed shaft.

In sub-step 312, the microprocessor 12 obtains a second boundary frequency using the following equation:

$$f2 = \frac{1}{2} \cdot \omega_{b2} \cdot \left(1 + \frac{d}{D} \cdot \cos\alpha'\right) \cdot Z, \quad (10)$$

where f2 represents the second boundary frequency, and $\omega_{132}$ represents the allowable maximum rotation frequency of the feed shaft of the motor 22.

In sub-step 313, the microprocessor 12 obtains a third boundary frequency using the following equation:

$$f3 = \frac{1}{2} \cdot \omega_{b3} \cdot \left(1 + \frac{d}{D} \cdot \cos\alpha'\right) \cdot Z, \quad (11)$$

where f3 represents the third boundary frequency, and $\omega_{b3}$ represents the predetermined minimum rotation frequency.

In step 35, the microprocessor 12 calculates a suggested rotation speed using the following equation:

$$\omega_{b4} = \frac{f4}{\frac{1}{2} \cdot \left(1 + \frac{d}{D} \cdot \cos\alpha'\right) \cdot Z}, \quad (12)$$

where f4 represents the measurement frequency, and $\omega_{b4}$ represents the suggested rotation speed expressed in revolutions per second (rps).

Using the above calculation, the microprocessor 12 is also able to obtain the suggested rotation speed, and to similarly enable the motor 22 to drive the feed system to rotate at the suggested rotation speed. Then, the vibration detector 11 is able to detect the vibration of the bearing with relatively lower noise effect.

To sum up, the method according to embodiments of the disclosure provides a way to obtain a rotational speed for the feed system 21 that results in a relatively lower noise effect (i.e., the suggested rotational speed), and then to detect the vibration of the to-be-detected component when the screw shaft of the feed system 21 is rotating at the suggested rotational speed. This may ensure that the resulting dynamic vibration signal has the relatively lower noise effect and higher accuracy.

Moreover, the method only requires one vibration detector 11 to achieve the desired effects, thus eliminating the necessity to employ multiple vibration detectors and/or a specific industrial vibration sensor, and allowing the vibration detection to be performed at a relatively lower cost.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding various inventive aspects.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A method for performing vibration detection on a machine tool (2), the method being implemented by a detecting device (1) that includes a microprocessor (12) and a vibration detector (11), the machine tool (2) including a feed system (21) and a motor (22) connected to the feed system (21), the feed system (21) including a number of rotational components, the method comprising steps of:
    a) calculating, by the microprocessor (12), a target frequency range associated with a rotation speed of the machine tool (2), the rotation speed of the machine tool (2) having a maximum value specified by an original equipment manufacturer (OEM) of the machine tool (2);
    b) detecting, by the vibration detector (11), vibration of the feed system (21) attributed to ambient noise when the feed system (21) is in a static state;
    c) calculating, by the microprocessor (12), a smoothed signal according to detected result of the vibration of the feed system (21) detected in step b), the smoothed signal including a plurality of noise amplitude values distributed across the target frequency range;
    d) identifying, by the microprocessor (12), a frequency within the target frequency range that corresponds with a smallest one of the noise amplitude values of the smoothed signal as a measurement frequency;
    e) calculating, by the microprocessor (12), a suggested rotation speed based on the measurement frequency;
    f) detecting, by the vibration detector (11), vibration of a to-be-detected component selected from the number of rotational components of the feed system (21) when the motor (22) is driving the number of rotational components of the feed system (21) to rotate at the suggested rotation speed; and
    g) obtaining, by the microprocessor (12), a dynamic vibration signal according to detected result of the vibration of the feed system (21) detected in step f).

2. The method of claim 1, wherein step b) includes detecting the vibration of the feed system (21) when the feed system (21) is in the static state, and outputting a time-domain vibration signal as the detected result of the vibration of the feed system (21) to the microprocessor (12),
    wherein step c) includes sub-steps of
        c1) converting the time-domain vibration signal into a frequency-domain vibration signal by applying the Fourier transform, the frequency-domain vibration signal spanning beyond the target frequency range,
        c2) obtaining an upper envelope signal of a truncated segment of the frequency-domain vibration signal that spans within the target frequency range, and
        c3) performing a smoothing operation on the upper envelope signal so as to obtain the smoothed signal.

3. The method of claim 2, wherein in sub-step c3), the smoothing operation is performed by one of calculating a moving average curve of the upper envelope signal and applying a low-pass filter to the upper envelope signal.

4. The method of claim 1, wherein step a) includes sub-steps of:
   a1) obtaining a first boundary frequency based on a predefined maximum rotation speed of the motor (22);
   a2) obtaining a second boundary frequency based on an allowable maximum rotation speed of a feed shaft of the feed system;
   a3) obtaining a third boundary frequency based on a predetermined minimum rotation speed that is associated with a rotation speed of the feed shaft; and
   a4) calculating the target frequency range based on the first boundary frequency, the second boundary frequency and the third boundary frequency.

5. The method of claim 4, wherein a maximum value of the target frequency range is set to be no greater than any one of the first boundary frequency and the second boundary frequency, and a minimum value of the target frequency range is set to be no smaller than the third boundary frequency.

6. The method of claim 4, wherein: in sub-step a1), the first boundary frequency is obtained by $$f1 = \frac{\omega_{m1}}{\Psi},$$

$$\omega_{m1} = \frac{\omega_{b1}}{1 + \frac{\left(1 + \frac{r_b \cdot \cos\alpha_0}{r_m}\right) \cdot (\tan\beta \cdot \sin\alpha_i + \cos\alpha_i)}{\left(1 - \frac{r_b \cdot \cos\alpha_i}{r_m}\right) \cdot (\tan\beta \cdot \sin\alpha_0 + \cos\alpha_0)}},$$

$$\frac{r_b}{r_m} = \frac{\sqrt{2 \cdot (1 - \cos\Psi) + (\Psi + \tan\alpha)^2}}{2},$$

where f1 represents the first boundary frequency, $\omega_{m1}$ represents a first revolution speed of the balls in the screw nut rotating around the screw shaft, $\psi$ represents a phase angle formed between adjacent balls in a screw nut of the feed system (21), $\omega_{b1}$ represents the predetermined maximum rotation speed of the motor (22), $r_b$ represents a radius of the balls in the screw nut, $\alpha$ represents a lead angle of the screw shaft, $\alpha_0$ represents an angle of contact between the balls in the screw nut and a groove in the screw nut, $\alpha_i$ represents an angle of contact between the balls in the screw nut and a groove in the screw shaft, $r_m$ represents a pitch circle radius of the screw shaft, and $\beta$ represents a spin angle of the balls of the screw nut.

7. The method of claim 4, wherein in sub-step a2), the second boundary frequency is obtained by $$f2 = \omega_{m2}/\Psi,$$

$$\omega_{m2} = \frac{\omega_{b2}}{1 + \frac{\left(1 + \frac{r_b \cdot \cos\alpha_0}{r_m}\right) \cdot (\tan\beta \cdot \sin\alpha_i + \cos\alpha_i)}{\left(1 - \frac{r_b \cdot \cos\alpha_i}{r_m}\right) \cdot (\tan\beta \cdot \sin\alpha_0 + \cos\alpha_0)}},$$

$$\frac{r_b}{r_m} = \frac{\sqrt{2 \cdot (1 - \cos\Psi) + (\Psi + \tan\alpha)^2}}{2},$$

where f2 represents the second boundary frequency, $\omega_{m2}$ represents a second revolution speed of a ball in the screw shaft of the motor (22), $\omega_{b2}$ represents the predetermined highest rotation speed of a feed axis of the motor (22), $\psi$ represents a phase angle formed between adjacent balls in a screw nut of the feed system (21), $r_b$ represents a radius of the balls in the screw nut, $\alpha$ represents a lead angle of the screw shaft, $\alpha_0$ represents an angle of contact between the balls in the screw nut and a groove in the screw nut, $\alpha_i$ represents an angle of contact between the balls in the screw nut and a groove in the screw shaft, $r_m$ represents a pitch circle radius of the screw shaft, and $\beta$ represents a spin angle of balls.

8. The method of claim 4, wherein in sub-step a3), the third boundary frequency is obtained by $$f3 = \frac{\omega_{m3}}{\Psi},$$

$$\omega_{m3} = \frac{\omega_{b3}}{1 + \frac{\left(1 + \frac{r_b \cdot \cos\alpha_0}{r_m}\right) \cdot (\tan\beta \cdot \sin\alpha_i + \cos\alpha_i)}{\left(1 - \frac{r_b \cdot \cos\alpha_i}{r_m}\right) \cdot (\tan\beta \cdot \sin\alpha_0 + \cos\alpha_0)}},$$

$$\frac{r_b}{r_m} = \frac{\sqrt{2 \cdot (1 - \cos\Psi) + (\Psi + \tan\alpha)^2}}{2},$$

where f3 represents the third boundary frequency, $\omega_{m3}$ represents a third revolution speed of a ball in the screw shaft of the motor (22), $\omega_{b3}$ represents the predetermined minimum rotation speed of the motor (22), $\psi$ represents a phase angle formed between adjacent balls in a screw nut of the feed system (21), $r_b$ represents a radius of the balls in the screw nut, $\alpha$ represents a lead angle of the screw shaft, $\alpha_0$ represents an angle of contact between the balls in the screw nut and a groove in the screw nut, $\alpha_i$ represents an angle of contact between the balls in the screw nut and a groove in the screw shaft, $r_m$ represents a pitch circle radius of the screw shaft, and $\beta$ represents a spin angle of balls in the screw nut.

9. The method of claim 4, wherein in step e), the suggested rotation speed is obtained by:

$$\omega_{b4} = f4 \cdot \Psi \cdot \left[1 + \frac{\left(1 + \frac{r_b \cdot \cos\alpha_0}{r_m}\right) \cdot (\tan\beta \cdot \sin\alpha_i + \cos\alpha_i)}{\left(1 - \frac{r_b \cdot \cos\alpha_i}{r_m}\right) \cdot (\tan\beta \cdot \sin\alpha_0 + \cos\alpha_0)}\right],$$

where f4 represents the measurement frequency, $\omega_{b4}$ represents the suggested rotation speed, $\psi$ represents a phase angle formed between adjacent balls in a screw nut of the feed system (21), $r_b$ represents a radius of the balls in the screw nut, $\alpha$ represents a lead angle of the screw shaft, $\alpha_0$ represents an angle of contact between the balls in the screw nut and a groove in the screw nut, $\alpha_i$ represents an angle of contact between the balls in the screw nut and a groove in the screw shaft, $r_m$ represents a pitch circle radius of the screw shaft, and $\beta$ represents a spin angle of balls in the screw nut.

10. The method of claim 4, wherein:
   in sub-step a1), the first boundary frequency is obtained by $$f1 = \frac{1}{2} \cdot \omega_{b1} \cdot \left(1 + \frac{d}{D} \cdot \cos\alpha'\right) \cdot Z,$$

where f1 represents the first boundary frequency, $\omega_{b1}$ represents the predetermined maximum rotation speed of the motor (22), d represents a diameter of balls in a bearing of the feed system (21), D represents a pitch circle diameter of the bearing, $\alpha'$ represents an angle of contact between the balls in the screw nut and an inner ring of the bearing, and Z represents a number of the balls in the bearing.

11. The method of claim 4, wherein:
in sub-step a2), the second boundary frequency is obtained by $$f2 = \frac{1}{2} \cdot \omega_{b2} \cdot \left(1 + \frac{d}{D} \cdot \cos\alpha'\right) \cdot Z,$$

where f2 represents the second boundary frequency, m represents the predetermined maximum rotation speed of a feed axle of the motor (22), d represents a diameter of a plurality of balls in a bearing of the feed system (21), D represents a pitch circle diameter of the bearing, $\alpha'$ represents an angle of contact between the balls in the screw nut and an inner ring of the bearing, and Z represents a number of the balls in the bearing.

12. The method of claim 4, wherein:
in sub-step a3), the second boundary frequency is obtained by $$f3 = \frac{1}{2} \cdot \omega_{b3} \cdot \left(1 + \frac{d}{D} \cdot \cos\alpha'\right) \cdot Z,$$

where f3 represents the third boundary frequency, $\omega_{b3}$ represents the predetermined minimum rotation speed of the motor (22), d represents a diameter of a plurality of balls in a bearing of the feed system (21), D represents a pitch circle diameter of the bearing, $\alpha'$ represents an angle of contact between the balls in the screw nut and an inner ring of the bearing, and Z represents a number of the balls in the bearing.

13. The method of claim 4, wherein in step e), the suggested rotation speed is obtained by:

$$\omega_{b4} = \frac{f4}{\frac{1}{2} \cdot \left(1 + \frac{d}{D} \cdot \cos\alpha'\right) \cdot Z},$$

where f4 represents the measurement frequency, $\omega_{b4}$ represents the suggested rotation speed, d represents a diameter of a plurality of balls in a bearing of the feed system (21), D represents a pitch circle diameter of the bearing, $\alpha'$ represents an angle of contact between the balls in the screw nut and an inner ring of the bearing, and Z represents a number of the balls in the bearing.

* * * * *